(12) United States Patent
Kish

(10) Patent No.: US 9,674,862 B2
(45) Date of Patent: *Jun. 6, 2017

(54) WIRELESS NETWORK THROUGHPUT ENHANCEMENT THROUGH CHANNEL AWARE SCHEDULING

(71) Applicant: RUCKUS WIRELESS, INC., Sunnyvale, CA (US)

(72) Inventor: William S. Kish, Saratoga, CA (US)

(73) Assignee: RUCKUS WIRELESS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,317

(22) Filed: Feb. 22, 2016

(65) Prior Publication Data

US 2016/0249376 A1 Aug. 25, 2016

Related U.S. Application Data

(63) Continuation of application No. 14/028,323, filed on Sep. 16, 2013, now Pat. No. 9,271,327, which is a
(Continued)

(51) Int. Cl.
*H04W 72/12* (2009.01)
*H04W 80/04* (2009.01)
*H04W 88/06* (2009.01)

(52) U.S. Cl.
CPC ....... *H04W 72/1242* (2013.01); *H04W 80/04* (2013.01); *H04W 88/06* (2013.01); *H04W 72/1257* (2013.01)

(58) Field of Classification Search
CPC . H04W 72/1242; H04W 80/04; H04W 88/06; H04W 72/1257
(Continued)

(56) References Cited

U.S. PATENT DOCUMENTS 1,653,664 A 12/1927 Kirkup
4,176,356 A 11/1979 Foster et al.
(Continued)

FOREIGN PATENT DOCUMENTS

CN 1 965 598 5/2007
CN 102763378 10/2012
(Continued)

OTHER PUBLICATIONS

Akyildiz et al., "Wireless mesh networks: a survey," Computer Networks, 2005.
(Continued)

*Primary Examiner* — Kan Yuen
*Assistant Examiner* — Richard Chang
(74) *Attorney, Agent, or Firm* — Lewis Roca Rothgerber Christie LLP

(57) ABSTRACT

A channel aware scheduler (CAS) is disclosed that takes advantage of changing wireless channel conditions in order to maximize aggregated system throughput. The CAS is aware of the different channel conditions for one or more stations and adjusts its scheduling of packet transmissions in light of the same. A related CAS algorithm may take advantage of that knowledge in order to increase aggregated system throughput while concurrently addressing other potential fairness constraints.

20 Claims, 7 Drawing Sheets

Related U.S. Application Data continuation of application No. 12/181,274, filed on Jul. 28, 2008, now Pat. No. 8,547,899.

(60) Provisional application No. 60/952,557, filed on Jul. 28, 2007.

(58) Field of Classification Search
USPC .......................................................... 370/328
See application file for complete search history.

(56) References Cited

U.S. PATENT DOCUMENTS

| | | |
|---|---|---|
| 4,193,077 A | 3/1980 | Greenberg et al. |
| 4,253,193 A | 2/1981 | Kennard |
| 4,305,052 A | 12/1981 | Baril et al. |
| 4,513,412 A | 4/1985 | Cox |
| 4,814,777 A | 3/1989 | Monser |
| 5,097,484 A | 3/1992 | Akaiwa |
| 5,117,430 A | 5/1992 | Berglund |
| 5,173,711 A | 12/1992 | Takeuchi et al. |
| 5,203,010 A | 4/1993 | Felix |
| 5,220,340 A | 6/1993 | Shafai |
| 5,220,678 A | 6/1993 | Feei |
| 5,361,256 A | 11/1994 | Doeringer |
| 5,373,548 A | 12/1994 | McCarthy |
| 5,408,465 A | 4/1995 | Gusella et al. |
| 5,507,035 A | 4/1996 | Bantz |
| 5,559,800 A | 9/1996 | Mousseau et al. |
| 5,570,366 A | 10/1996 | Baker |
| 5,608,726 A | 3/1997 | Virgile |
| 5,636,213 A | 6/1997 | Eastmond et al. |
| 5,754,145 A | 5/1998 | Evans |
| 5,767,809 A | 6/1998 | Chuang et al. |
| 5,802,312 A | 9/1998 | Lazaridis et al. |
| 5,867,109 A | 2/1999 | Wiedeman |
| 5,930,259 A | 7/1999 | Katsube |
| 5,940,771 A | 8/1999 | Gollnick et al. |
| 5,960,344 A | 9/1999 | Mahany |
| 5,964,830 A | 10/1999 | Durrett |
| 5,970,410 A | 10/1999 | Carney et al. |
| 5,974,034 A | 10/1999 | Chin et al. |
| 6,018,659 A | 1/2000 | Ayyagari et al. |
| 6,034,638 A | 3/2000 | Thiel et al. |
| 6,044,062 A | 3/2000 | Brownrigg et al. |
| 6,088,570 A | 7/2000 | Komara et al. |
| 6,094,177 A | 7/2000 | Yamamoto |
| 6,132,306 A | 10/2000 | Trompower |
| 6,181,697 B1 | 1/2001 | Nurenbreg |
| 6,249,516 B1 | 6/2001 | Brownrigg et al. |
| 6,266,528 B1 | 7/2001 | Farzaneh |
| 6,266,537 B1 | 7/2001 | Kashitani et al. |
| 6,292,153 B1 | 9/2001 | Aiello et al. |
| 6,307,524 B1 | 10/2001 | Britain |
| 6,317,599 B1 | 11/2001 | Rappaport et al. |
| 6,326,922 B1 | 12/2001 | Hegendoerfer |
| 6,337,628 B2 | 1/2002 | Campana et al. |
| 6,337,668 B1 | 1/2002 | Ito et al. |
| 6,339,404 B1 | 1/2002 | Johnson et al. |
| 6,345,043 B1 | 2/2002 | Hsu |
| 6,356,242 B1 | 3/2002 | Ploussios |
| 6,356,243 B1 | 3/2002 | Schneider et al. |
| 6,356,553 B1 | 3/2002 | Nagami et al. |
| 6,356,905 B1 | 3/2002 | Gershman et al. |
| 6,377,227 B1 | 4/2002 | Zhu et al. |
| 6,392,610 B1 | 5/2002 | Braun et al. |
| 6,393,261 B1 | 5/2002 | Lewis |
| 6,404,386 B1 | 6/2002 | Proctor, Jr. et al. |
| 6,404,775 B1 | 6/2002 | Leslie et al. |
| 6,407,719 B1 | 6/2002 | Ohira et al. |
| 6,414,955 B1 | 7/2002 | Clare et al. |
| 6,418,138 B1 | 7/2002 | Cerf et al. |
| 6,442,507 B1 | 8/2002 | Skidmore et al. |
| 6,445,688 B1 | 9/2002 | Garces et al. |
| 6,493,679 B1 | 12/2002 | Rappaport et al. |
| 6,498,589 B1 | 12/2002 | Horii |
| 6,499,006 B1 | 12/2002 | Rappaport et al. |
| 6,505,253 B1 | 1/2003 | Chiu |
| 6,507,321 B2 | 1/2003 | Oberschmidt et al. |
| 6,570,883 B1 * | 5/2003 | Wong .................. H04L 12/5602 370/232 |
| 6,584,080 B1 | 6/2003 | Ganz et al. |
| 6,625,454 B1 | 9/2003 | Rappaport et al. |
| 6,674,459 B2 | 1/2004 | Ben-Shachar et al. |
| 6,701,522 B1 | 3/2004 | Rubin et al. |
| 6,704,301 B2 | 3/2004 | Chari et al. |
| 6,714,551 B1 | 3/2004 | Le-Ngoc |
| 6,725,281 B1 | 4/2004 | Zintel et al. |
| 6,728,514 B2 | 4/2004 | Bandeira et al. |
| 6,753,814 B2 | 6/2004 | Killen et al. |
| 6,762,723 B2 | 7/2004 | Nallo et al. |
| 6,778,517 B1 | 8/2004 | Lou et al. |
| 6,779,004 B1 | 8/2004 | Zintel |
| 6,819,287 B2 | 11/2004 | Sullivan et al. |
| 6,836,481 B1 | 12/2004 | Hotta |
| 6,873,627 B1 | 3/2005 | Miller |
| 6,876,280 B2 | 4/2005 | Nakano |
| 6,888,504 B2 | 5/2005 | Chiang et al. |
| 6,888,893 B2 | 5/2005 | Li et al. |
| 6,892,230 B1 | 5/2005 | Gu et al. |
| 6,906,678 B2 | 6/2005 | Chen |
| 6,910,068 B2 | 6/2005 | Zintel et al. |
| 6,924,768 B2 | 8/2005 | Wu et al. |
| 6,931,429 B2 | 8/2005 | Gouge et al. |
| 6,941,143 B2 | 9/2005 | Mathur |
| 6,950,019 B2 | 9/2005 | Bellone et al. |
| 6,957,042 B2 | 10/2005 | Williams |
| 6,957,277 B2 | 10/2005 | Yagyu et al. |
| 6,961,028 B2 | 11/2005 | Joy et al. |
| 6,973,622 B1 | 12/2005 | Rappaport et al. |
| 6,975,834 B1 | 12/2005 | Forster |
| 6,996,086 B2 | 2/2006 | Wolfe et al. |
| 7,034,770 B2 | 4/2006 | Yang et al. |
| 7,043,277 B1 | 5/2006 | Pfister |
| 7,050,809 B2 | 5/2006 | Lim |
| 7,053,853 B2 | 5/2006 | Merenda et al. |
| 7,064,717 B2 | 6/2006 | Kaluzni et al. |
| 7,076,274 B2 | 7/2006 | Jollota et al. |
| 7,085,814 B1 | 8/2006 | Ghandhi et al. |
| 7,089,307 B2 | 8/2006 | Zintel et al. |
| 7,113,519 B2 | 9/2006 | Hammel et al. |
| 7,130,895 B2 | 10/2006 | Zintel et al. |
| 7,136,655 B2 | 11/2006 | Skafidas et al. |
| 7,149,197 B2 | 12/2006 | Garahi et al. |
| 7,157,757 B2 | 1/2007 | Parekh et al. |
| 7,161,934 B2 | 1/2007 | Buchsbaum |
| 7,164,667 B2 | 1/2007 | Rayment et al. |
| 7,171,223 B2 | 1/2007 | Herscovich et al. |
| 7,171,475 B2 | 1/2007 | Weisman et al. |
| 7,187,925 B2 | 3/2007 | Abhishek |
| 7,203,508 B2 | 4/2007 | Ohkubo et al. |
| 7,269,174 B2 | 9/2007 | Olson et al. |
| 7,283,494 B2 | 10/2007 | Hammel et al. |
| 7,289,505 B2 | 10/2007 | Sanchez |
| 7,292,617 B2 | 11/2007 | Beasley et al. |
| 7,321,571 B2 | 1/2008 | Schnack et al. |
| 7,336,642 B2 | 2/2008 | Rich et al. |
| 7,355,997 B2 | 4/2008 | Qian |
| 7,362,737 B2 | 4/2008 | Behroozi |
| 7,369,510 B1 | 5/2008 | Wong |
| 7,489,932 B2 | 2/2009 | Chari et al. |
| 7,496,680 B2 | 2/2009 | Canright |
| 7,505,426 B2 | 3/2009 | Srikrishna et al. |
| 7,505,447 B2 | 3/2009 | Kish et al. |
| 7,515,589 B2 | 4/2009 | Bacher et al. |
| 7,522,731 B2 | 4/2009 | Kiemba et al. |
| 7,546,126 B2 | 6/2009 | Beasley et al. |
| 7,551,562 B2 | 6/2009 | Srikrishna et al. |
| 7,586,879 B2 | 9/2009 | Chari et al. |
| 7,672,274 B2 | 3/2010 | Bims |
| 7,697,504 B2 | 4/2010 | Chari et al. |
| 7,715,395 B2 | 5/2010 | Ginchereau et al. |
| 7,733,833 B2 | 6/2010 | Kalika et al. |
| 7,787,436 B2 | 8/2010 | Kish et al. |
| 7,852,837 B1 | 12/2010 | Au et al. |

(56) References Cited

U.S. PATENT DOCUMENTS

| | | |
|---|---|---|
| 7,853,829 B2 | 12/2010 | Younger et al. |
| 7,916,684 B2 | 3/2011 | Henderson et al. |
| 7,974,223 B2 | 7/2011 | Zelig et al. |
| 8,089,869 B2 | 1/2012 | Kisela et al. |
| 8,089,949 B2 | 1/2012 | Kish et al. |
| 8,125,975 B2 | 2/2012 | Kish et al. |
| 8,355,343 B2 | 1/2013 | Kish et al. |
| 8,547,899 B2 | 10/2013 | Kish |
| 8,619,662 B2 | 12/2013 | Kish |
| 8,634,402 B2 | 1/2014 | Kish |
| 8,638,708 B2 | 1/2014 | Kish |
| 8,688,834 B2 | 4/2014 | Fujimoto et al. |
| 8,780,760 B2 | 7/2014 | Kish |
| 8,824,357 B2 | 9/2014 | Kish et al. |
| 9,066,152 B2 | 6/2015 | Kish |
| 9,071,942 B2 | 6/2015 | Kish |
| 2001/0047474 A1 | 11/2001 | Takagi et al. |
| 2001/0055312 A1 | 12/2001 | Negus |
| 2002/0001310 A1 | 1/2002 | Mai |
| 2002/0031130 A1 | 3/2002 | Tsuchiya et al. |
| 2002/0036996 A1 | 3/2002 | Ozluturk et al. |
| 2002/0045435 A1 | 4/2002 | Fantaske |
| 2002/0047800 A1 | 4/2002 | Proctor, Jr. et al. |
| 2002/0080767 A1 | 6/2002 | Lee |
| 2002/0084942 A1 | 7/2002 | Tsai et al. |
| 2002/0105471 A1 | 8/2002 | Kojima et al. |
| 2002/0112058 A1 | 8/2002 | Weisman et al. |
| 2002/0114330 A1 | 8/2002 | Cheung et al. |
| 2002/0143951 A1 | 10/2002 | Khan |
| 2002/0158798 A1 | 10/2002 | Chiang et al. |
| 2002/0158801 A1 | 10/2002 | Crilly, Jr. et al. |
| 2002/0164963 A1 | 11/2002 | Tehrani et al. |
| 2002/0170064 A1 | 11/2002 | Monroe et al. |
| 2002/0194367 A1 | 12/2002 | Nakamura et al. |
| 2003/0003917 A1 | 1/2003 | Copley et al. |
| 2003/0026240 A1 | 2/2003 | Eyuboglu et al. |
| 2003/0026268 A1 | 2/2003 | Nava |
| 2003/0030588 A1 | 2/2003 | Kalis et al. |
| 2003/0043786 A1 | 3/2003 | Kall |
| 2003/0063591 A1 | 4/2003 | Leung et al. |
| 2003/0122714 A1 | 7/2003 | Wannagot et al. |
| 2003/0128711 A1 | 7/2003 | Olariu et al. |
| 2003/0129978 A1 | 7/2003 | Akiyama |
| 2003/0133458 A1 | 7/2003 | Sato et al. |
| 2003/0169330 A1 | 9/2003 | Ben-Shachar et al. |
| 2003/0184490 A1 | 10/2003 | Raiman et al. |
| 2003/0189514 A1 | 10/2003 | Miyano et al. |
| 2003/0189521 A1 | 10/2003 | Yamamoto et al. |
| 2003/0189523 A1 | 10/2003 | Ojantakanen et al. |
| 2003/0210207 A1 | 11/2003 | Suh et al. |
| 2003/0227414 A1 | 12/2003 | Saliga et al. |
| 2003/0228857 A1 | 12/2003 | Maeki |
| 2003/0231593 A1 | 12/2003 | Bauman et al. |
| 2004/0008663 A1 | 1/2004 | Srikrishna |
| 2004/0014432 A1 | 1/2004 | Boyle |
| 2004/0017310 A1 | 1/2004 | Vargas-Hurlston et al. |
| 2004/0017860 A1 | 1/2004 | Liu |
| 2004/0027291 A1 | 2/2004 | Zhang et al. |
| 2004/0027304 A1 | 2/2004 | Chiang et al. |
| 2004/0028006 A1 | 2/2004 | Kayama |
| 2004/0032378 A1 | 2/2004 | Volman et al. |
| 2004/0036651 A1 | 2/2004 | Toda |
| 2004/0036654 A1 | 2/2004 | Hsieh |
| 2004/0041732 A1 | 3/2004 | Aikawa et al. |
| 2004/0048593 A1 | 3/2004 | Sano |
| 2004/0058690 A1 | 3/2004 | Ratzel et al. |
| 2004/0061653 A1 | 4/2004 | Webb et al. |
| 2004/0070543 A1 | 4/2004 | Masaki |
| 2004/0080455 A1 | 4/2004 | Lee |
| 2004/0085993 A1 | 5/2004 | Wentink |
| 2004/0095278 A1 | 5/2004 | Kanemoto et al. |
| 2004/0114535 A1 | 6/2004 | Hoffmann et al. |
| 2004/0125777 A1 | 7/2004 | Doyle et al. |
| 2004/0190477 A1 | 9/2004 | Olson et al. |
| 2004/0194143 A1 | 9/2004 | Hirose |
| 2004/0260800 A1 | 12/2004 | Gu et al. |
| 2004/0264463 A1 | 12/2004 | Fukushima |
| 2005/0002395 A1 | 1/2005 | Kondo |
| 2005/0009523 A1 | 1/2005 | Pekonen |
| 2005/0022210 A1 | 1/2005 | Zintel et al. |
| 2005/0032531 A1 | 2/2005 | Gong et al. |
| 2005/0041739 A1 | 2/2005 | Li et al. |
| 2005/0042988 A1 | 2/2005 | Hoek et al. |
| 2005/0074018 A1 | 4/2005 | Zintel et al. |
| 2005/0074019 A1 | 4/2005 | Handforth et al. |
| 2005/0074108 A1 | 4/2005 | Dezonno et al. |
| 2005/0097503 A1 | 5/2005 | Zintel et al. |
| 2005/0100016 A1 | 5/2005 | Miller et al. |
| 2005/0135480 A1 | 6/2005 | Li et al. |
| 2005/0138137 A1 | 6/2005 | Encarnacion et al. |
| 2005/0138193 A1 | 6/2005 | Encarnacion et al. |
| 2005/0153720 A1 | 7/2005 | White et al. |
| 2005/0180381 A1 | 8/2005 | Retzer et al. |
| 2005/0185666 A1 | 8/2005 | Raya |
| 2005/0188193 A1 | 8/2005 | Kuehnel et al. |
| 2005/0226239 A1 | 10/2005 | Nishida et al. |
| 2005/0232179 A1 | 10/2005 | Da Costa et al. |
| 2005/0240665 A1 | 10/2005 | Gu et al. |
| 2005/0250544 A1 | 11/2005 | Grant et al. |
| 2005/0259682 A1 | 11/2005 | Yosef et al. |
| 2005/0267935 A1 | 12/2005 | Ghandhi et al. |
| 2005/0271070 A1 | 12/2005 | Mikami et al. |
| 2006/0018335 A1 | 1/2006 | Koch |
| 2006/0045089 A1 | 3/2006 | Bacher et al. |
| 2006/0092864 A1 | 5/2006 | Gupta et al. |
| 2006/0094371 A1 | 5/2006 | Nguyen |
| 2006/0098605 A1 | 5/2006 | Li |
| 2006/0098607 A1 | 5/2006 | Zeng et al. |
| 2006/0098613 A1 | 5/2006 | Kish et al. |
| 2006/0098616 A1 | 5/2006 | Kish et al. |
| 2006/0114881 A1 | 6/2006 | Chari |
| 2006/0123124 A1 | 6/2006 | Weisman et al. |
| 2006/0123125 A1 | 6/2006 | Weisman et al. |
| 2006/0123455 A1 | 6/2006 | Pai et al. |
| 2006/0133341 A1 | 6/2006 | Chari et al. |
| 2006/0165029 A1 | 7/2006 | Melpignano et al. |
| 2006/0168159 A1 | 7/2006 | Weisman et al. |
| 2006/0184660 A1 | 8/2006 | Rao et al. |
| 2006/0184661 A1 | 8/2006 | Weisman et al. |
| 2006/0184693 A1 | 8/2006 | Rao et al. |
| 2006/0224690 A1 | 10/2006 | Falkenburg et al. |
| 2006/0225107 A1 | 10/2006 | Seetharaman et al. |
| 2006/0227761 A1 | 10/2006 | Scott, III et al. |
| 2006/0239369 A1 | 10/2006 | Lee |
| 2006/0268881 A1 | 11/2006 | Moreton |
| 2006/0280131 A1 | 12/2006 | Rahman et al. |
| 2006/0291434 A1 | 12/2006 | Gu et al. |
| 2007/0002750 A1* | 1/2007 | Sang ............... H04W 72/1236 370/238 |
| 2007/0002858 A1 | 1/2007 | Bichot et al. |
| 2007/0010271 A1 | 1/2007 | Roy |
| 2007/0027622 A1 | 2/2007 | Cleron et al. |
| 2007/0030811 A1 | 2/2007 | Frei et al. |
| 2007/0072612 A1* | 3/2007 | Haraguchi ............ H04W 36/02 455/436 |
| 2007/0101020 A1 | 5/2007 | Lin et al. |
| 2007/0109961 A1 | 5/2007 | Liang |
| 2007/0135167 A1 | 6/2007 | Liu |
| 2007/0189283 A1 | 8/2007 | Agarwal et al. |
| 2007/0223451 A1 | 9/2007 | Ren et al. |
| 2007/0242602 A1 | 10/2007 | Pang et al. |
| 2007/0280168 A1* | 12/2007 | Shibata ................ H04L 1/0003 370/331 |
| 2008/0043638 A1 | 2/2008 | Ribiere |
| 2008/0063002 A1 | 3/2008 | Zheng et al. |
| 2008/0069068 A1 | 3/2008 | Dean et al. |
| 2008/0137681 A1 | 6/2008 | Kish et al. |
| 2008/0137682 A1 | 6/2008 | Kish et al. |
| 2008/0159207 A1 | 7/2008 | Levine et al. |
| 2008/0225804 A1 | 9/2008 | Thubert |
| 2008/0247317 A1 | 10/2008 | Weil et al. |
| 2008/0247327 A1 | 10/2008 | Weil et al. |
| 2008/0267116 A1 | 10/2008 | Kang et al. |
| 2008/0305743 A1 | 12/2008 | Aithal et al. |

(56) References Cited

U.S. PATENT DOCUMENTS

| | | |
|---|---|---|
| 2009/0019314 A1 | 1/2009 | Younger et al. |
| 2009/0028095 A1 | 1/2009 | Kish et al. |
| 2009/0040989 A1 | 2/2009 | Da Costa et al. |
| 2009/0067369 A1 | 3/2009 | Stamoulis |
| 2009/0073921 A1 | 3/2009 | Ji et al. |
| 2009/0080333 A1 | 3/2009 | Ozer et al. |
| 2009/0154359 A1 | 6/2009 | Strutt et al. |
| 2009/0180396 A1 | 7/2009 | Kish et al. |
| 2009/0207730 A1 | 8/2009 | Stamoulis et al. |
| 2009/0213730 A1 | 8/2009 | Zeng et al. |
| 2009/0225676 A1 | 9/2009 | Kisela et al. |
| 2009/0262677 A1 | 10/2009 | Banerjea et al. |
| 2010/0040056 A1 | 2/2010 | Kobayashi |
| 2010/0085916 A1 | 4/2010 | Yu et al. |
| 2010/0182944 A1 | 7/2010 | Kish et al. |
| 2011/0019653 A1 | 1/2011 | Seok |
| 2011/0096712 A1 | 4/2011 | Kish et al. |
| 2011/0119360 A1 | 5/2011 | Miu et al. |
| 2011/0119401 A1 | 5/2011 | Miu et al. |
| 2011/0130197 A1 | 6/2011 | Bytnar et al. |
| 2011/0158233 A1 | 6/2011 | Namgung |
| 2011/0216685 A1 | 9/2011 | Kish et al. |
| 2012/0063379 A1 | 3/2012 | Kish et al. |
| 2013/0010775 A1 | 1/2013 | Kish et al. |
| 2013/0194969 A1 | 8/2013 | Kish |
| 2014/0071879 A1 | 3/2014 | Kish |
| 2014/0133385 A1 | 5/2014 | Kish |
| 2014/0177511 A1 | 6/2014 | Kish |
| 2015/0312727 A1 | 10/2015 | Kish |

FOREIGN PATENT DOCUMENTS

| | | |
|---|---|---|
| EP | 0 352 787 | 7/1989 |
| EP | 0 534 612 | 3/1993 |
| EP | 1 315 311 | 5/2003 |
| EP | 1 450 521 | 8/2004 |
| EP | 1 608 108 | 12/2005 |
| EP | 1 653 664 | 5/2006 |
| EP | 2 350 863 | 8/2015 |
| GB | 2306278 | 4/1997 |
| JP | H03-038933 | 2/1991 |
| JP | H08-088633 | 4/1996 |
| JP | 2001-057560 | 2/2001 |
| JP | 2005-354249 | 12/2005 |
| JP | 2006-060408 | 3/2006 |
| VN | 31159 | 10/2012 |
| WO | WO 02/25967 | 3/2002 |
| WO | WO 02/49360 | 6/2002 |
| WO | WO 03/079484 | 9/2003 |
| WO | WO 2004/057817 | 7/2004 |
| WO | WO 2005/008938 | 1/2005 |
| WO | WO 2006/052639 | 5/2006 |
| WO | WO 2007/016326 | 2/2007 |
| WO | WO 2009/088488 | 7/2009 |
| WO | WO 2011/060454 | 5/2011 |
| WO | WO 2012/061531 | 5/2012 |

OTHER PUBLICATIONS

Alimian, Areg et al., "Analysis of Roaming Techniques," doc.:IEEE 802.11-04/0377r1, Submission, Mar. 2004.

Cato et al., "Method for Easier, Better, and Faster Site Surveys for Wireless Networks," IBM Technical Disclosure Bulletin, vol. 40, No. 1, 1997.

Chang, Nicholas B. et al., "Optimal Channel Probing and Transmission Scheduling for Opportunistics Spectrum Access," Sep. 2007.

Chawla, "Design of a Wireless Backhaul Network for Microcells," 1999.

Cisco Systems, "Cisco Aironet Access Point Software Configuration Guide: Configuring Filters and Quality of Service," Aug. 2003.

Dell Inc., "How Much Broadcast and Multicast Traffic Should I Allow in My Network," PowerConnect Application Note #5, Nov. 2003.

Dunkels, Adam et al., "Connecting Wireless Sensornets with TCP/IP Networks," Proc. of the 2d Int'l Conf. on Wired Networks, Frankfurt, Feb. 2004.

Dunkels, Adam et al., "Making TCP/IP Viable for Wireless Sensor Networks," Proc. of the 1st Euro. Workshop on Wireless Sensor Networks, Berlin, Jan. 2004.

Dutta, Ashutosh et al., "MarconiNet Supporting Streaming Media Over Localized Wireless Multicast," Proc. of the 2d Int'l Workshop on Mobile Commerce, 2002.

Fair queuing, http://en.wikipedia.org/wiki/fair_queuing. Aug. 11, 2008.

Festag, Andreas, "What is MOMBASA?" Telecommunication Networks Group (TKN), Technical University of Berlin, Mar. 7, 2002.

Gillham, Bruce et al. JUNOSe Internet Software for E-Series Routing Platforms Policy and QoS Configuration Guide, Release 7.0x, Sep. 7, 2005.

Golmie, Nada, "Coexistence in Wireless Networks: Challenges and System-Level Solutions in the Unlicensed Bands," Cambridge University Press, 2006.

Hewlett Packard, "HP ProCurve Networking: Enterprise Wireless LAN Networking and Mobility Solutions," 2003.

Hirayama, Koji et al., "Next-Generation Mobile-Access IP Network," Hitachi Review vol. 49, No. 4, 2000.

Hjalmtysson et al., Overcoming Last-Hop/First-Hop Problems in IP Multicast, Reykjavik University, Dept. of Computer Science, Ofanleiti 2, 103 Reykjavik, Iceland, (The Icelandic Center for Research under grant No. 020500002.). Sep. 16-19, 2003.

Ian R. Akyildiz, et al., "A Virtual Topology Based Routing Protocol for Multihop Dynamic Wireless Networks," Broadband and Wireless Networking Lab, School of Electrical and Computer Engineering, Georgia Institute of Technology, Jul. 1, 2001.

Information Society Technologies Ultrawaves, "System Concept / Architecture Design and Communication Stack Requirement Document," Feb. 23, 2004.

Johansson et al., "Relaying Access Points and Related Business Models for Low Cost Mobile Systems," 2004.

Ken Tang, et al., "MAC Layer Broadcast Support in 802.11 Wireless Networks," Computer Science Department, University of California, Los Angeles, 2000 IEEE, pp. 544-548.

Ken Tang, et al., "MAC Reliable Broadcast in Ad Hoc Networks," Computer Science Department, University of California, Los Angeles, 2001 IEEE, pp. 1008-1013.

Mawa, Rakesh, "Power Control in 3G Systems," Hughes Systique Corporation, Jun. 28, 2006.

Pat Calhoun et al., "802.11r strengthens wireless voice," Technology Update, Network World, Aug. 22, 2005, http://www.networkworld.com/news/tech/2005/082208techupdate.html.

Steger, Christopher et al., "Performance of IEEE 802.11b Wireless LAN in an Emulated Mobile Channel," 2003.

Toskala, Antti, "Enhancement of Broadcast and Introduction of Multicast Capabilities in RAN," Nokia Networks, Palm Springs, California, Mar. 13-16, 2001.

Tsunekawa, Kouichi "Diversity Antennas for Portable Telephones," 39th IEEE Vehicular Technology, May 1-3, 1989, San Francisco, CA.

Vincent D. Park, et al., "A Performance Comparison of the Temporally-Ordered Routing Algorithm and Ideal Link-State Routing," IEEE, Jul. 1998, pp. 592-598.

Visoottiviseth et al., Sender-Initiated Mulitcast Forwarding Scheme, Telecommunications, 2003, ICT 2003 10th International Conference, pp. 334-339, downloaded on Mar. 26, 2009 from IEEE Xplore, 0-7803-7661 (c) 2003 IEEE.

Weighted Fair Queuing, http://en.wikipedia.org/wiki/Weighted_fair_queuing. Aug. 10, 2008.

Weighted Round Robin, http:en.wikipedia.org/wiki/Weighted_round_robin May 4, 2008.

Wennstrom, Mattias et al., "Transmit Antenna Diversity in Ricean Fading MIMO Channels with Co-Channel Interference," 2001.

Yanikomeroglu, "Cellular Multihop Communications: Infrastructure-Based Relay Network Architecture for 4G Wireless Systems," 2004.

(56) References Cited

OTHER PUBLICATIONS

PCT Search Report and Written Opinion for PCT/US08/014148 mailed Mar. 30, 2009.
PCT Search Report and Written Opinion for PCT/US11/059019 mailed Feb. 21, 2012.
PCT Search Report and Written Opinion for PCT/US05/039760 mailed Sep. 14, 2006.
PCT Search Report and Written Opinion for PCT/US10/56908 mailed May 3, 2011.
CN Application No. 20058001629.7, Office Action dated Feb. 21, 2012.
Chinese Application No. 201080002467.X, Office Action dated Jul. 3, 2014.
Chinese Application No. 20058001629.7, Office Action dated Aug. 6, 2014.
Chinese Application No. 20058001629.7, Office Action dated Jan. 21, 2014.
Chinese Application No. 201080002467.X, Second Office Action dated Jan. 26, 2015.
EP Application No. 10813061.8. Supplementary European Search Report dated Jul. 23, 2012.
EP Application No. 10813061.8. Extended European Search Report dated Oct. 21, 2011.
TW Application No. 094138837, Office Action dated Apr. 25, 2013.
TW Application No. 094138836, Office Action dated Nov. 28, 2011.
TW Application No. 103106913, Office Action dated May 28, 2015.
U.S. Appl. No. 12/008,715, Office Action mailed Sep. 2, 2011.
U.S. Appl. No. 12/008,715, Final Office Action mailed Nov. 23, 2010.
U.S. Appl. No. 12/008,715, Office Action mailed Jun. 7, 2010.
U.S. Appl. No. 12/008,715, Office Action mailed Oct. 16, 2009.
U.S. Appl. No. 13/736,017 Office Action mailed Nov. 21, 2013.
U.S. Appl. No. 11/232,196, Office Action mailed May 15, 2008.
U.S. Appl. No. 11/232,196, Final Office Action mailed Dec. 26, 2007.
U.S. Appl. No. 11/232,196, Office Action mailed Apr. 5, 2007.
U.S. Appl. No. 11/985,865, Notice of Allowance mailed Dec. 20, 2010.
U.S. Appl. No. 11/985,866, Office Action mailed Dec. 16, 2009.
U.S. Appl. No. 11/985,866, Office Action mailed May 29, 2009.
U.S. Appl. No. 11/267,477, Final Office Action mailed Oct. 6, 2010.
U.S. Appl. No. 11/267,477, Office Action mailed Jun. 16, 2010.
Microsoft Corporation, "IEEE 802.11 Networks and Windows XP," Windows Hardware Developer Central, Dec. 4, 2001.
U.S. Appl. No. 11/267,477, Final Office Action mailed Jun. 10, 2009.
U.S. Appl. No. 11/267,477, Office Action mailed Sep. 25, 2008.
U.S. Appl. No. 12/181,274, Final Office Action mailed Jun. 19, 2013.
U.S. Appl. No. 12/181,274, Office Action mailed Nov. 15, 2012.
U.S. Appl. No. 12/181,274, Final Office Action mailed Jan. 18, 2012.
U.S. Appl. No. 12/181,274, Office Action mailed Jun. 10, 2011.
U.S. Appl. No. 12/947,800, Final Office Action mailed Jul. 17, 2013.
U.S. Appl. No. 12/947,800, Office Action mailed Sep. 26, 2012.
U.S. Appl. No. 12/947,803, Final Office Action mailed Jul. 17, 2013.
U.S. Appl. No. 12/947,803, Office Action mailed Aug. 27, 2012.
U.S. Appl. No. 12/938,316, Office Action mailed Nov. 20, 2012.
U.S. Appl. No. 14/106,514, Office Action mailed Sep. 22, 2014.
U.S. Appl. No. 14/160,402 Office Action mailed Oct. 22, 2014.
U.S. Appl. No. 14/080,488, Office Action mailed Oct. 21, 2014.
U.S. Appl. No. 11/267,477, Decision on Appeal mailed Nov. 14, 2014.
U.S. Appl. No. 12/947,800, Final Office Action mailed May 18, 2016.
U.S. Appl. No. 12/947,803, Final Office Action mailed May 18, 2016.
U.S. Appl. No. 14/748,141, Office Action mailed Oct. 21, 2016.
U.S. Appl. No. 14/979,018, Final Office Action mailed Nov. 4, 2016.
U.S. Appl. No. 12/947,800, Office Action mailed Dec. 2, 2016.
U.S. Appl. No. 12/947,803, Office Action mailed Dec. 30, 2016.
U.S. Appl. No. 14/748,141, Notice of Allowance mailed Jan. 20, 2017.

\* cited by examiner

US 9,674,862 B2

WIRELESS NETWORK THROUGHPUT ENHANCEMENT THROUGH CHANNEL AWARE SCHEDULING

CROSS-REFERENCE TO RELATED APPLICATIONS

The present application is a continuation and claims the priority benefit of U.S. patent application Ser. No. 14/028,323 filed Sep. 16, 2013, which is a continuation and claims the priority benefit of U.S. patent application Ser. No. 12/181,274 filed Jul. 28, 2008, now U.S. Pat. No. 8,547,899 issued on Oct. 1, 2013, which claims the priority benefit of U.S. provisional application No. 60/952,557 filed Jul. 28, 2007, the disclosures of which are incorporated herein by reference.

BACKGROUND OF THE INVENTION

Field of the Invention

The present invention generally relates to communications networks. More particular, the present invention related to systems and method for increased data throughput in communications networks.

Description of the Related Art

A wireless channel is generally understood as a pathway between two communication endpoints. Through a wireless channel, the communication of any number of forms of data may take place. The efficient and effective communication of data is, however, subject to any number of characteristics of a particular wireless channel.

For example, a wireless channel with low throughput would not be recommended for the communication of data related to a high-definition television program. Similarly, the use of a wireless channel with a large amount of available bandwidth may be better utilized in the context of time-sensitive data transfers (e.g., voice communications) rather than the exchange of low priority and low-bandwidth background data queries.

Characteristics of a wireless channel may vary over time. For example, a wireless channel that at one moment has available bandwidth may subsequently be subjected to bottlenecks and dropped data packets thus requiring retransmission of the same. These variances in network characteristics may be a result of, for example, terminal mobility, multipath fading, or interference.

With respect to terminal mobility, a terminal may (while in motion) access wireless services from different locations. The mobility of the terminal requires the network to expend resources related to identifying and locating that terminal. The accessing of the network at different locales over time in conjunction with the need of the network to identify and locate the terminal may affect the quality of a wireless signal in that network.

Multipath fading involves the phenomenon of multipath propagation whereby a radio signal arrives at a receiving station (e.g., an antenna), at different times, via two or more paths. Multipath propagation may be induced by the refracting and reflecting of a wireless signal by various objects in the wireless environment (e.g., walls and metal objects). As a result of multipath propagation, the wireless signal is distorted thereby resulting in a deteriorated communications experience, which may include jitter or ghosting in the case of audio or video content.

Interference, broadly stated, may be mobile or static. In the case of mobile interference, the reception of a signal by a first mobile device (e.g., a wireless terminal) may be impeded or degraded by the transmission of a signal by another mobile device. Static interference is representative of the superposition of white noise (i.e., static) and other disturbing influences on a wireless signal. These influences are inclusive of thermal noise, electronic noise from receiver input circuits, and radiated electromagnetic noise that might be picked up by a receiving station's antenna.

FIG. 1A illustrates how characteristics of a wireless channel may vary over time in light of the aforementioned terminal mobility, multipath fading, and interference. FIG. 1A illustrates a wireless channel 100 where signal quality 110 between an access point (AP) and station are illustrated as a function of time 120. As can be seen from FIG. 1A, signal quality 110 is less at T+1 than at T+2. The signal quality 110 for T+1 and T+2 is less than the signal quality 110 illustrated at T+3, which is nearly equivalent to that of the signal quality 110 exhibited at T+4. Signal quality 110 improves at T+5 while experiencing a significant decrease at T+6.

Further complicating the understanding of wireless channel characteristics (and the optimal use of those channels) is that channel conditions often lack correlation amongst one another in a network of stations. The lack of correlation may be a result of different distances from an AP to a particular station, distances from a station (or the AP) to a particular source of interference, the movement of a mobile terminal or station, as well as varying multipath fading effects. FIG. 1B is exemplary in this regard with respect to illustrating the signal quality 110 between the aforementioned AP and Station A (130) and the AP and Station B (140). As shown in FIG. 1B, there is no immediately recognizable correlation in signal quality vis-a-vis the AP and the differing stations (130/140).

One attempt at managing variances in wireless channel characteristics, especially as they pertain to different stations, has been through the use of a scheduler. Schedulers may be embodied in hardware and/or software components—the latter being executable from memory or a storage device by a corresponding processing device—with respect to providing scheduling policies, rules, procedure, or other criteria in making scheduling decisions. A scheduler may, in light of the aforementioned policies or criteria and a given set of packets, select particular packets for serial transmission over a particular wireless channel.

Different scheduling policies may be used in an attempt to ensure a communications network's ability to provide different quality of service (QOS) guarantees. Policies may include strict priority (SP) where a particular station queue is always allocated bandwidth and/or transmitted before other queues. An alternative policy includes round robin (RR) scheduling, which assigns bandwidth and transmits packets in equal portion, in order, and without priority to a particular station queue.

Weighted round robin (WRR), on the other hand, is a best-effort scheduling discipline (i.e., the network does not provide any guarantees that data is delivered or that a user is given a guaranteed QOS level or priority). Through WRR scheduling, station queues can be assigned a weight—an integer value that might indicate capacity or priority. Station queues with higher weights have their packets transmitted prior to those with lesser weights. All queues are eventually given regular transmission access to a channel albeit it those queues with higher weight will get more transmission access attempts than those with lesser weights.

Yet another scheduling policy is fair queuing (FQ), which allows several packet flows to fairly share link capacity. Fair queuing differs from first-in-first-out (FIFO) (i.e., what comes in first is handled first and what comes in next waits until the first is finished) in that an ill-behaved flow that consists of, for example, large data packets or a large number of packets will punish itself and not other packet flows. In FQ scheduling, in order to decide which packet should be forwarded first, the FQ algorithm estimates a virtual finishing time of all candidate packets (i.e., the packets at the head of all non-empty queues) based on, for example, the arrival time of the packet, the packet size, and the number of queues. The FQ scheduling algorithm or policy then compares the virtual finishing time and selects the minimum one. The packet with the minimum virtual finishing time is transmitted.

A still further scheduling policy is weighted fair queuing (WFQ), which allows different scheduling priorities to be statistically multiplexed. WFQ is a generalization of the aforementioned FQ algorithm where each data flow has a separate FIFO queue. Whereas the aforementioned ill-behaved queue will only punish itself, WFQ allows different sessions to have different service shares. If N data flows currently are active, with weights $\omega_1, \omega_2 \ldots \omega_N$, data flow number i will achieve an average data rate of $$\frac{R\omega_i}{(\omega_1 | \omega_2 | \ldots | \omega_N)}$$

An end-to-end delay bound can be guaranteed in WFQ scheduling. By dynamically regulating WFQ weights, this policy can be used to control QOS and achieve a guaranteed data rate.

Typical wireless devices (e.g., an 802.11x compliant device) implement a simple class and/or priority scheduling mechanism with a FIFO queue per each traffic class. An example of such a mechanism 200 is illustrated in FIG. 2. The scheduling mechanism 200 of FIG. 2 illustrates four classes of traffic priority: voice (230), video (240), best-effort (250), and background (260). While the voice, video, best-effort, and background represent the typical four traffic priorities, the actual number of classes may vary in order to accommodate, for example, additional traffic classes and management traffic.

In the scheduling mechanism 200 of FIG. 2, packets are introduced to the wireless device via a network/input interface 210. It should be noted that certain hardware components (e.g. a processor or memory) are not illustrated in that one skilled in the art will appreciate and understand the requisite components to implement the various applications disclosed herein. Packets may be received from another wireless device, a network backbone, a router, or a primary source of content that has been converted into data packets for transmission.

Packets are then routed to the classifier 220. The classifier 220 may identify packets based on application layer data regardless of port. The classifier 220 may alternatively identify packets based on Internet Protocol (IP) address, port numbers, and so on. Packet classification based on multiple fields may be implemented using basic search algorithms, geometric algorithms, heuristic algorithms, or hardware-specific search algorithms. A variety of methodologies for packet classification are generally known in the art.

Once classified by classifier 220, packets are then routed to an appropriate queue: voice, video, best-effort, background (230-260). The priority scheduler 270 then schedules the classified and queued packets. In the priority based queuing and scheduling mechanism 200 of FIG. 2, all packet traffic of a specific class (e.g., voice (230)) is subjected to FIFO queuing. Scheduling is done strictly by priority (SP). As such, priority N (e.g., voice (230)) must be empty before priority N+1 (e.g., video (240)) is allowed to transmit. Packets are then transmitted or further routed via the appropriate network/output interface 280.

Problems exist with respect to prior art scheduling methodologies based on priority queuing with per class FIFO. Channel aware scheduling (as discussed in further detail below) may not be implemented in this context. For example, traffic to different stations is interleaved within each FIFO queue. Further, only one packet is available at any given time—the packet at the head of the highest priority queue.

Typical prior art scheduler implementations also blindly retransmit the head end packet from the highest priority active queue until that packet is either successfully acknowledged by the recipient or some maximum number of retransmissions occurs. This blind retransmission causes head-of-line blocking. As a result, poor system performance results and, in many circumstances, clients may become completely impaired.

SUMMARY OF THE PRESENTLY CLAIMED INVENTION

An embodiment of the presently claimed invention includes a system for increasing wireless network throughput. The system includes a classifier configured to assign a packet to one of a plurality of transmission queues. The system further includes a first scheduling module and a second scheduling module. The first scheduling module is stored in a computer-readable medium and executable by a processing device to select an assigned packet for transmission from one of the plurality of transmission queues in accordance with a strict priority schedule. The second scheduling module is likewise stored in a computer-readable medium and executable to select a priority scheduled packet for transmission, wherein the selection is made in accordance with a weighted scheduling technique.

In a second embodiment of the presently claimed invention, a method for increasing wireless throughput is disclosed. The method includes the steps of assigning a packet to one of a plurality of transmission queues; selecting an assigned packet for transmission from one of the plurality of transmission queues in accordance with a priority schedule; selecting a priority scheduled packet for transmission in accordance with a weighted scheduling technique; and transmitting the packet.

A third embodiment is for a computer-readable storage medium having embodied thereon a program. The program is executable by a processing device to perform a method for increasing wireless throughput, the method includes the steps of assigning a packet to one of a plurality of transmission queues; selecting an assigned packet for transmission from one of the plurality of transmission queues in accordance with a priority schedule; selecting a priority scheduled packet for transmission in accordance with a weighted scheduling technique; and transmitting the packet.

DETAILED DESCRIPTION

The presently disclosed invention utilizes channel aware scheduling. Through channel aware scheduling, an optimized scheduler—a channel aware scheduler (CAS)—takes advantage of changing wireless channel conditions in order to maximize aggregated system throughput. A CAS is aware of the different channel conditions for one or more stations and adjusts its scheduling of packet transmissions in light of the same. The CAS algorithm may take advantage of that knowledge in order to increase aggregated system throughput while concurrently addressing other potential fairness constraints.

Figure 3:
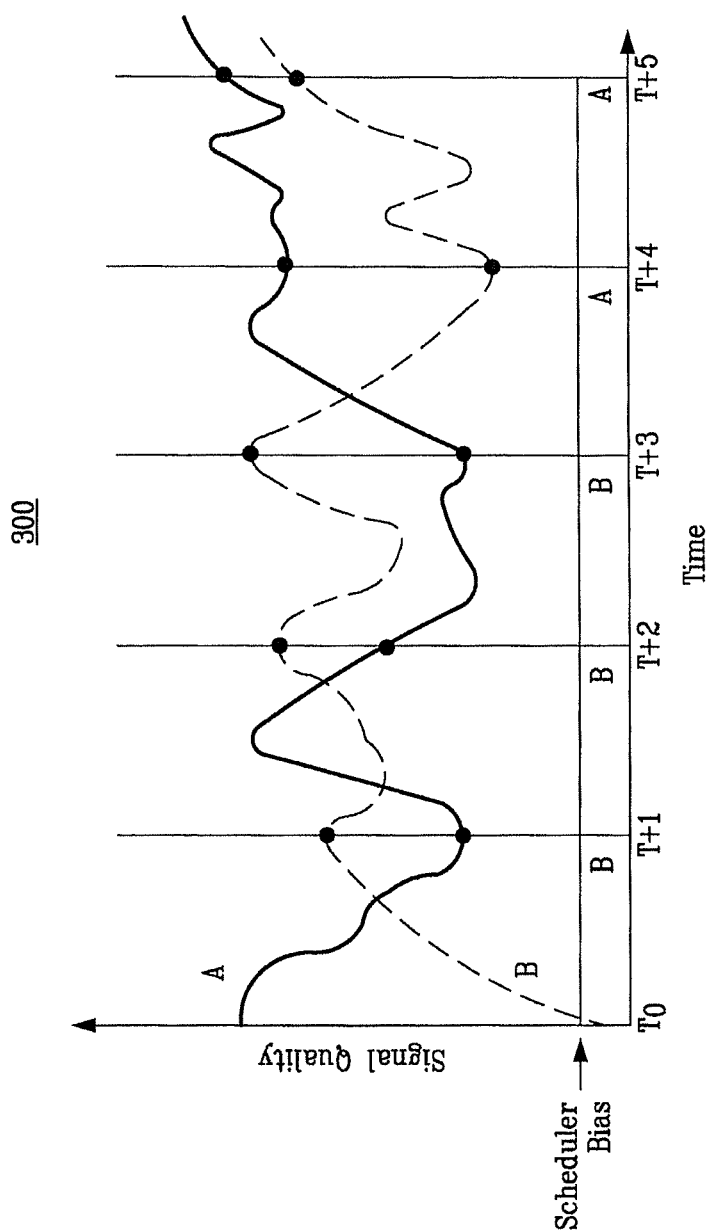
FIG. 3 illustrates the biasing of a scheduler in a channel aware scheduler network environment involving an AP and two stations.

FIG. 3 illustrates an example of how a CAS may be beneficial in a network environment 300 involving an AP and two stations (A and B). Based on the particular signal quality for each station (A or B) over time (T=0, T+1, T+N), the scheduler is biased toward one station or the other (i.e., the scheduler is aware of the quality of both channels). For example, at time T+1, +2 and, +3, the scheduler is biased toward station B while at time T+4 and T+5, the scheduler is biased to station A.

The CAS mechanism of the present invention allows for finer queuing and scheduling granularity with respect to individual stations and packet flows. An embodiment of the present invention utilizes hierarchical scheduling. In a first level of the hierarchy, an SP scheduling algorithm may be employed as is common to enterprise and service-provider class networking equipment. In a second level, the CAS mechanism may utilize WRR or WFQ scheduling algorithms as described above.

Figure 1A:
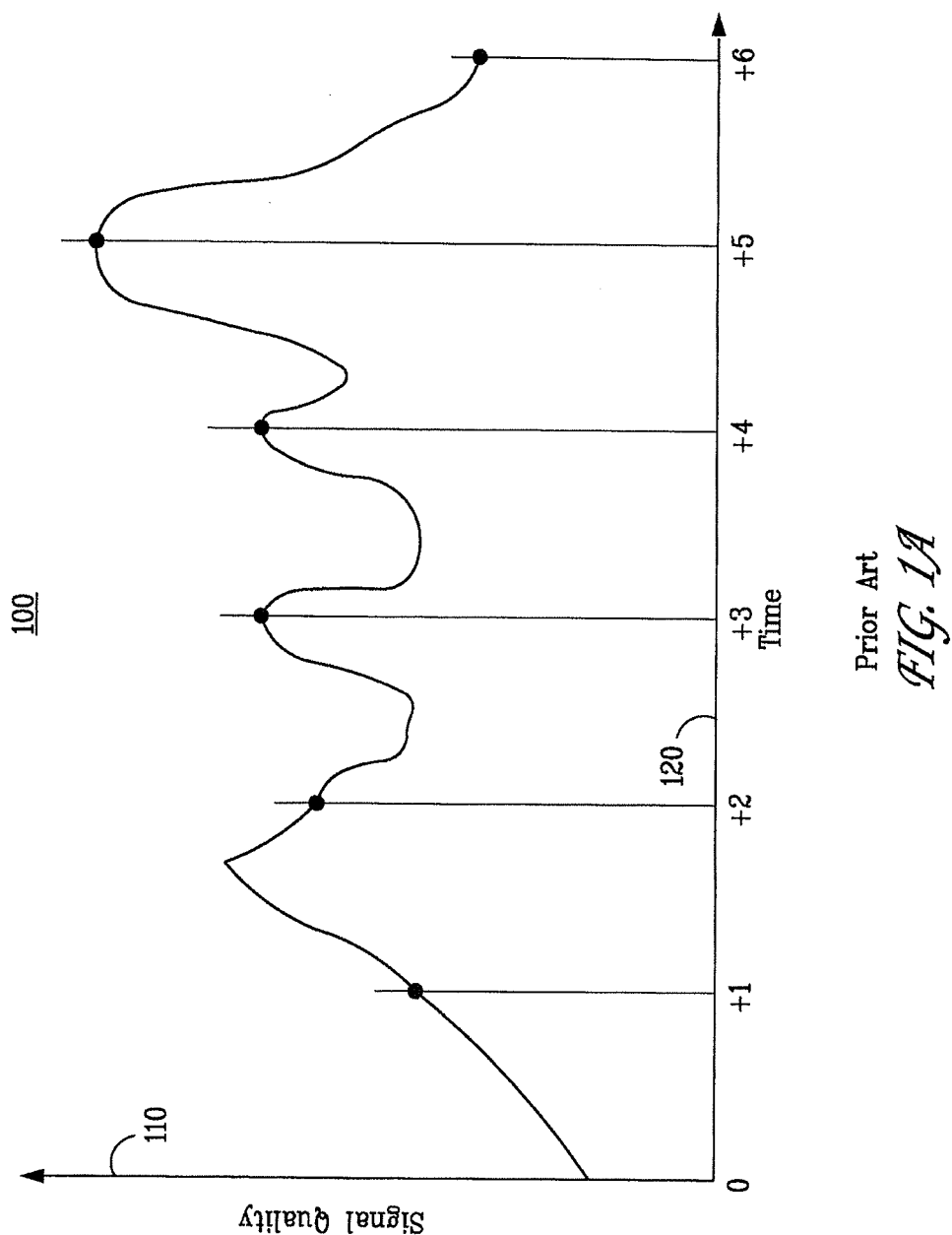
FIG. 1A illustrates a wireless channel where signal quality between an access point and station are sown as a function of time.
Figure 1B:
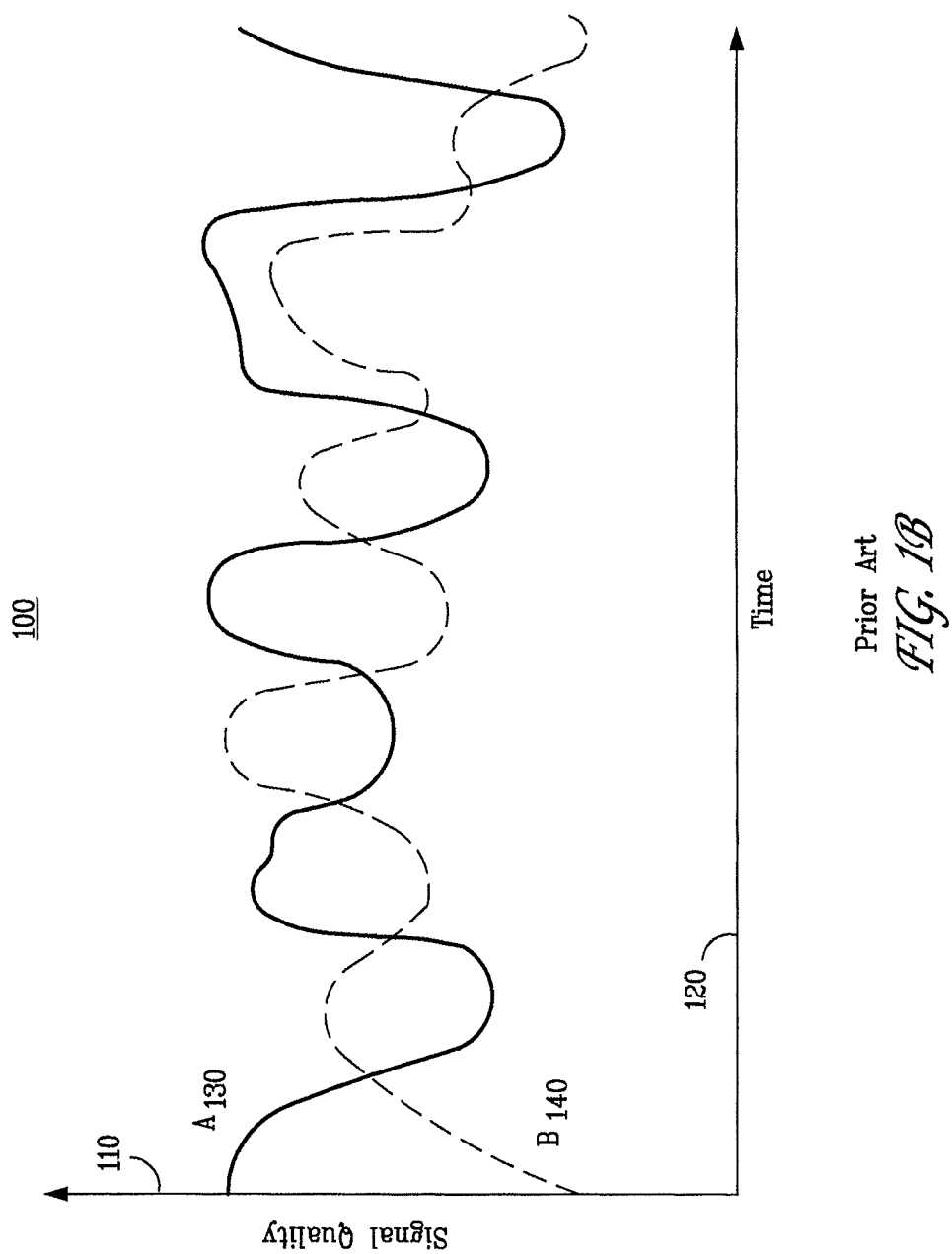
FIG. 1B illustrates signal quality between an access point and two stations.
Figure 2:
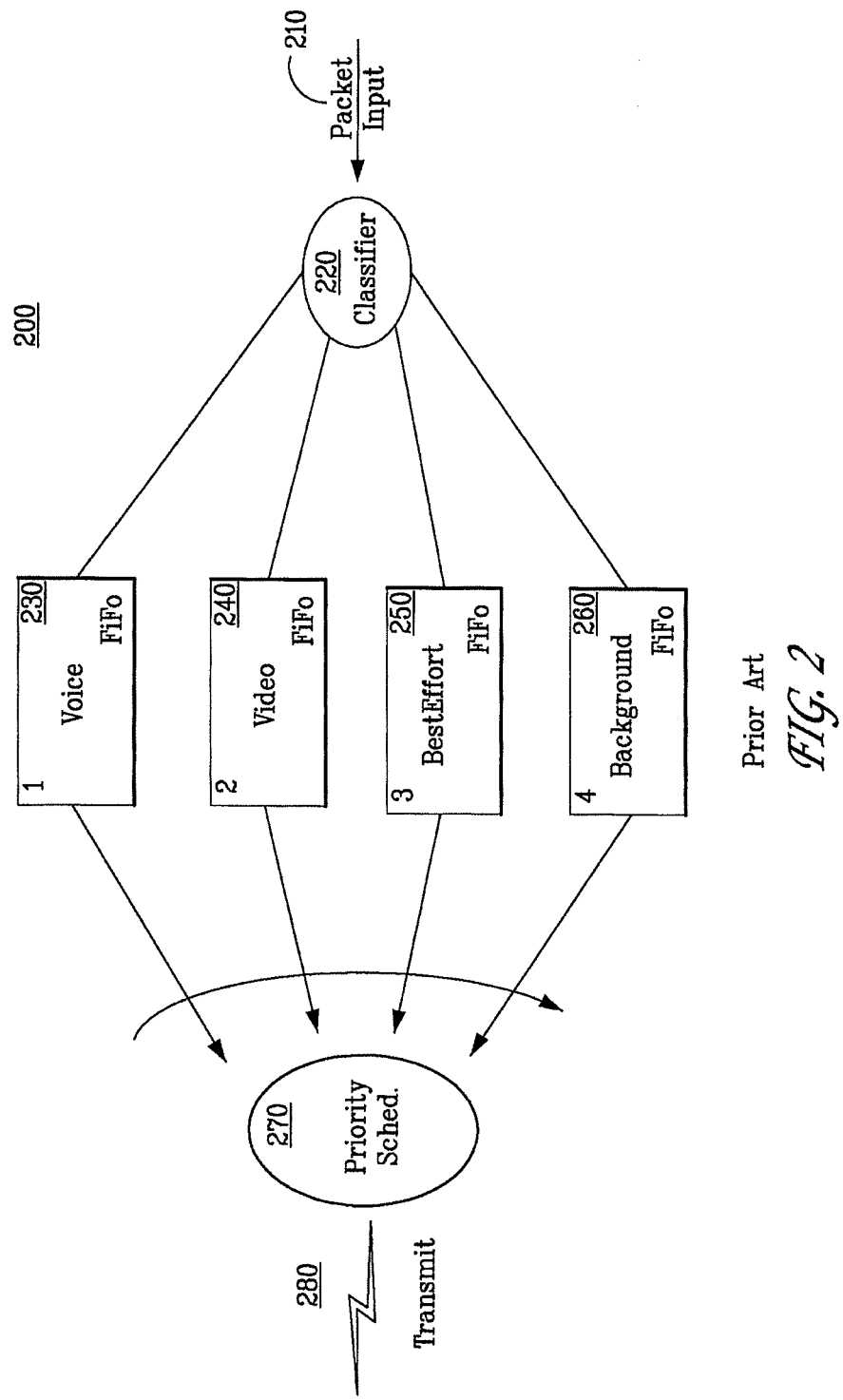
FIG. 2 illustrates a class/priority scheduling mechanism with a FIFO queue for each traffic class.
Figure 4:
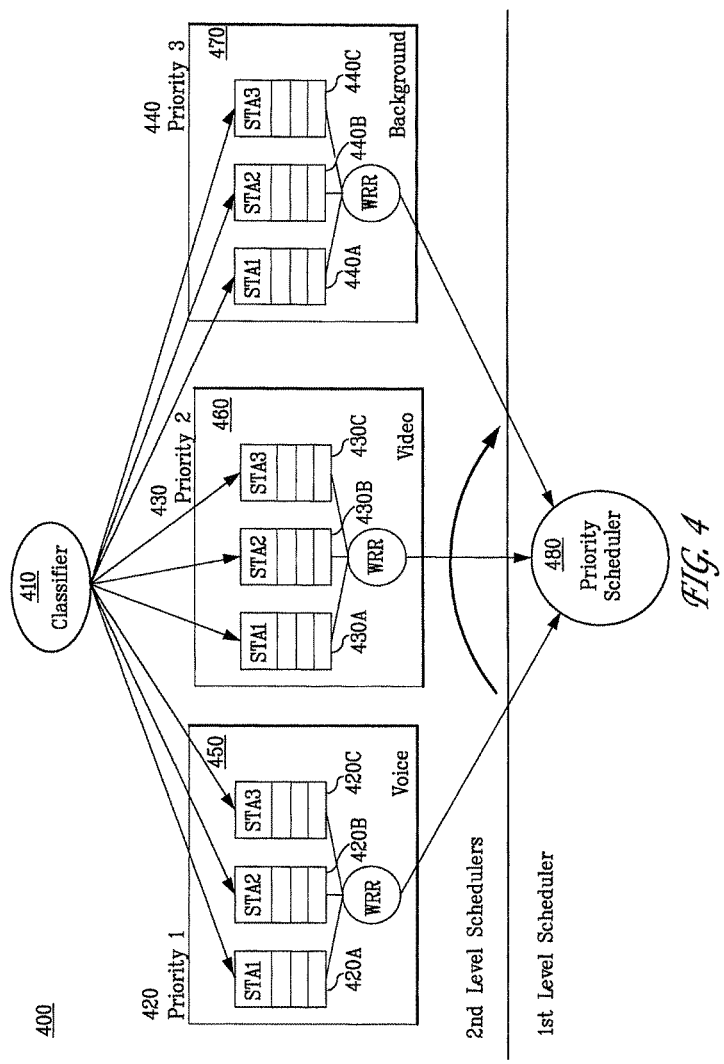
FIG. 4 illustrates an embodiment of a channel aware scheduling mechanism utilizing hierarchical schedulers.

FIG. 4 illustrates an embodiment of a CAS mechanism 400 utilizing the aforementioned hierarchical schedulers. Packets are received at classifier 410 following initial receipt by a network/input interface. Classifier 410 may operate in a manner similar to classifier 220 as illustrated in FIG. 2.

Following classification of an incoming packet at a wireless device implementing the CAS mechanism 400 of FIG. 4, the packet is routed to a first part of the scheduling hierarchy (i.e., a second level scheduler). In FIG. 4, this first portion of the scheduling hierarchy is represented by a queue with an associated priority. The CAS mechanism 400 of FIG. 4 illustrates three priority queues, which may be representative of voice, video, and background (420-440, respectively). Differing numbers of priority queues may be implemented subject to the particular type of packet flows being received at the CAS mechanism 400. For example, if the wireless device implementing CAS mechanism 400 is dedicated to the delivery of Internet Packet Television (IPTV) content, the voice queue (420) may be omitted.

Corresponding to each priority queue (420-440) in FIG. 4 is one or more station queues (420A-420C; 430A-430C; and 440A-440C). Each of the station queues 420A-420C; 430A-430C; and 440A-440C operates in conjunction with a WRR mechanism (450-470). Utilizing an associated WRR mechanism, each station queue 420A-420C; 430A-430C; and 440A-440C is assigned a weight indicative of capacity or priority. Station queues 420A-420C; 430A-430C; and 440A-440C with higher weights will have their packets transmitted prior to those with lesser weights. Weighting of a station queue is discussed in greater detail with respect to FIG. 6 below.

Following assignment to a priority and weighted station queue in the first portion of the hierarchy, the priority scheduler 480 of the second portion of the hierarchy (i.e., the first level scheduler) assumes responsibility for scheduling the transmission of the classified, prioritized, weighted, and queued packets. The priority scheduler 480 of FIG. 4 may operate in a fashion similar to that of the priority scheduler 270 in FIG. 2. Packets are then transmitted or further routed via an appropriate network/output interface.

In some embodiments, the CAS mechanism 400 of FIG. 4 may utilize additional scheduling techniques such as deferred retransmission and weighted feedback. Both of these techniques may be implemented in the context of the second level schedulers of FIG. 4.

In the case of deferred retransmission, an indication of a failed transmission may be used to temporarily defer transmission or retransmission to the failed station and instead service other active stations in a priority queue. A deferred retransmission module may make direct use of a standard retransmission request mechanism such as an 802.11 acknowledgment (ACK) that would indicate a retransmission is required when no ACK is received.

Alternatively, an Automated Repeat Request (ARQ), which uses acknowledgments and timeouts to achieve reliable data transmission, may be used. A Hybrid Automated Repeat Request (HARQ) may also be used. In standard ARQ, error-detection information (ED) bits are added to data to be transmitted, such as cyclic redundancy check (CRC). In HARQ, forward error correction (FEC) bits are also added to the existing ED bits, such as Reed-Solomon code or Turbo code. As a result HARQ performs better than ordinary ARQ in poor signal conditions but may adversely affect the environment in good signal conditions. HARQ may have particular applicability to the IEEE 802.16-2005 standard for mobile broadband wireless access, also known as 'mobile WiMAX.' HARQ mechanisms also tend to be implemented in hardware.

The absence of an ACK or the receipt of an ARQ or HARQ (i.e., a retransmission request) operates as an indication of packet corruption. Packet corruption, in turn, is an indication of potential channel fade or other adverse channel condition. Upon indication of a retransmission requirement, the second level scheduler mechanism may elect to defer retransmission and move on to the next queue station that has pending packets.

Figure 5:
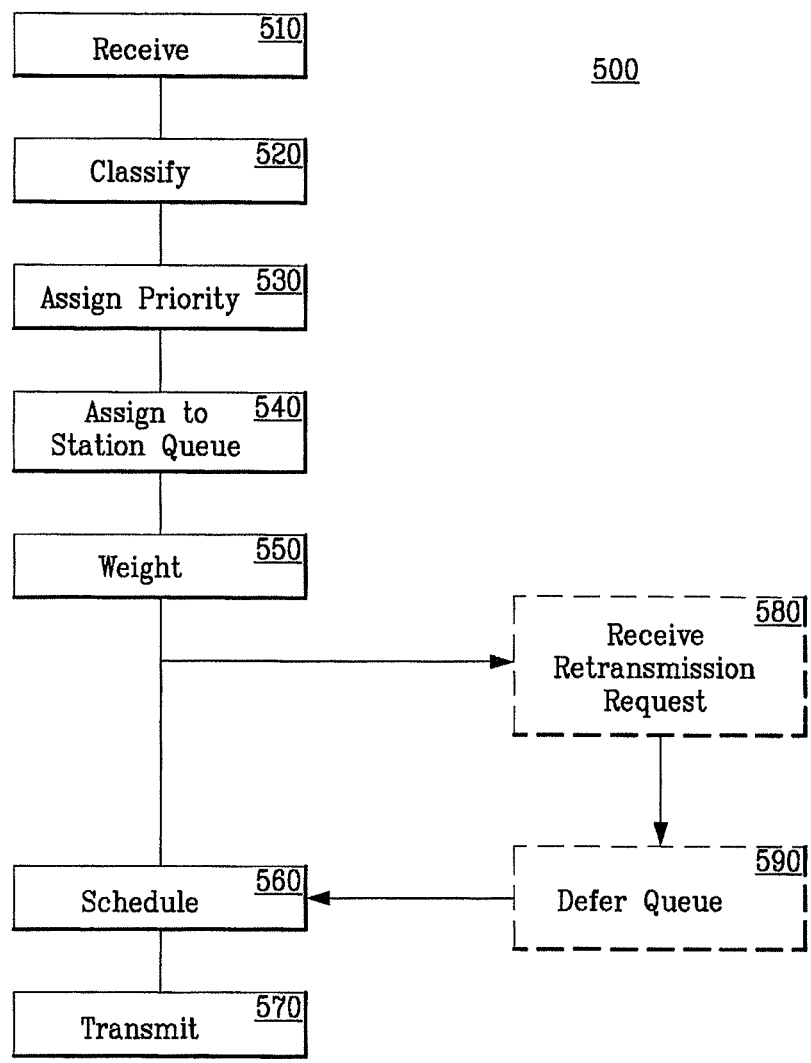
FIG. 5 illustrates a method for channel aware scheduling transmission including a channel aware scheduler mechanism utilizing a deferred retransmission module.

FIG. 5 illustrates a method for CAS transmission in accordance with the CAS mechanism 400 of FIG. 4 as well as a CAS mechanism utilizing a deferred retransmission module.

In step 510, a packet is received. Receipt of the packet may occur via a network/input interface. Packets may be received from another wireless device, a network backbone, a router, or a primary source of content that has been converted into data packets for transmission.

In step 520, received packets are classified. The packets may be classified based on an application layer data regardless of port. Packets may also be identified and subsequently classified based on IP address, port numbers, and so on.

Packet classification based on multiple fields may be implemented using basic search algorithms, geometric algorithms, heuristic algorithms, or hardware-specific search algorithms.

In step 530, packets are routed to an appropriate priority queue. Packets are then assigned to a station queue in step 540. Weighting of the station queues takes place in step 550. It should be noted that station queue weighting may be dynamic or static and may take place prior to or concurrent with the transmission of any particular packet or packet flow. Weighting of a station queue is discussed further with respect to FIG. 6. Packets are scheduled solely based on priority in 560 and transmitted in accordance with that priority in step 570.

In an alternative embodiment of a CAS mechanism that utilizes a deferred retransmission module, a retransmission request is received at optional step 580. In response to the retransmission request, a particular station queue is deferred in optional step 590. Scheduling of the remaining priority and channel queues takes place in step 560 as would occur in an embodiment not utilizing a deferred retransmission module. Transmission of the scheduled packets takes place in step 570.

Figure 6:
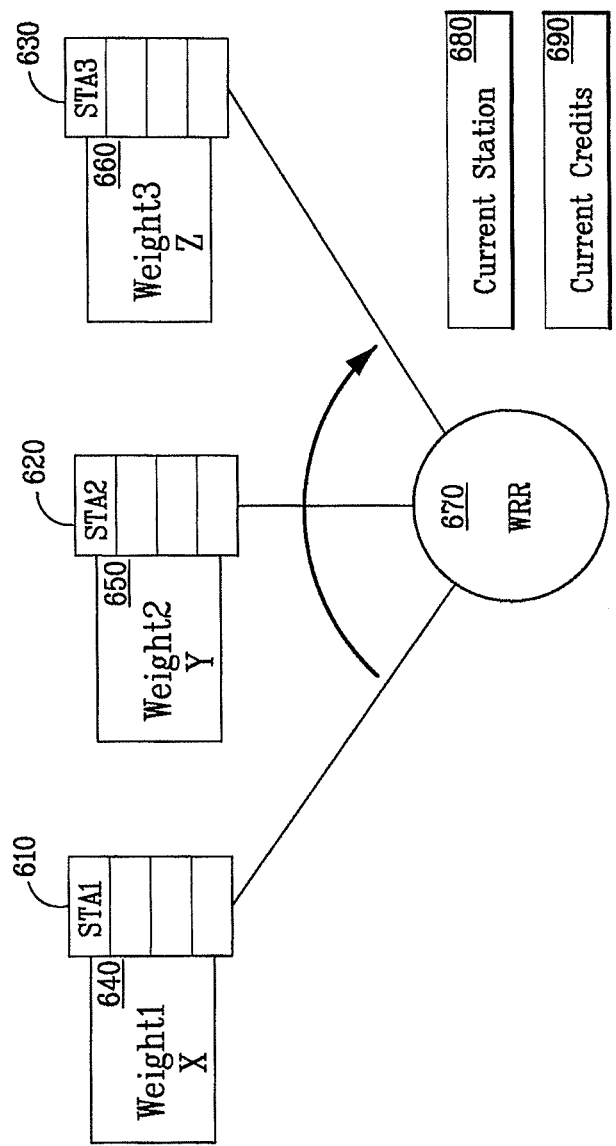
FIG. 6 illustrates queue weighting as may occur in the context of the channel aware scheduler mechanism of FIG. 4 and the corresponding method of FIG. 5.

FIG. 6 illustrates queue weighting as may occur in the context of the CAS mechanism of FIG. 4 and the corresponding method of FIG. 5. Using a WRR algorithm, a weight (640-660) is determined for each queue (610-630). The WRR scheduler 670 (e.g., WRR 450) then round robins between active queues (those that have pending packets) and transmits up to N packets from a queue where N is the weight associated with that queue.

Weighting may be implemented via credit register 690 that is loaded with a particular weight when a new station queue 680 is selected. The credit register 680 is decremented with each transmission from that station queue 680. When the credit register 690 reaches 0, the WRR scheduler 670 advances in a round robin fashion to the next queue with an associated load of credits.

An embodiment of the CAS mechanism utilizing a deferred retransmission module may modify the WRR scheduler 670 as follows. Upon receipt of a retransmission requirement, it is determined from which station queue the failed packet originated. The failed packet is then re-queued at the head of that queue. If that particular queue is still active (i.e., the queue still has credits), the queue is penalized through the additional decrement of the credit register or decrementing the credit register to zero thereby forcing an activation of a queue associated with a different station. These penalization activities may take place in the context of optional step 590 of FIG. 5.

A further embodiment of the CAS mechanism disclosed herein may implement weighted feedback, which may be applicable to a hierarchical implementation utilizing WFQ or WRR. In such an embodiment, per-station channel conditions are estimated. These estimates may utilize low-level metrics such as signal-to-noise ratio (SNR) or error-to-vector magnitude (EVM). Application level metrics such as estimated throughput may also be utilized. Queue weights are modified to reflect channel conditions such that the scheduler favors stations with the better channel. Generally, weights are proportional to each channel capacity in order to maximize throughput. Weights may be limited to some minimal value to prevent the starvation of poor stations.

A still further embodiment of weight feedback involves, for each associated station, the performance of throughput estimation. Estimation may occur using a throughput model and packet encoding rule (PER) statistics. Packet transmission time stamps may also be used. If the estimated throughput is below some minimum threshold, the estimated throughput is set to the minimum threshold in order to ensure that some minimal bandwidth allocation is made with respect to each station. The WRR or WFQ weight is scaled proportionally to the estimated throughput.

Computer-executable instructions and associated data structures represent examples of the programming means for executing steps of the methods and implementing particular system configurations disclosed herein. Such methodologies may be stored in a computer-readable storage medium. Such methodologies may be executed in the context of a corresponding processing device.

While the present invention has been described in the context of a series of exemplary embodiments, these descriptions are not intended to limit the scope of the invention to the particular forms set forth herein. To the contrary, the present description is intended to cover such alternatives, modifications, and equivalents as may be included within the spirit and scope of the invention as defined by the appended claims and otherwise appreciated by one of ordinary skill in the art.

What is claimed is:

1. A system for increasing wireless network throughput, the system comprising:

a packet classifier for receiving a data packet and assign the packet to one of a plurality of priority transmission queues, wherein each of the plurality of the priority transmission queues includes an associated packet priority level for data transmission and one or more station queues, wherein each station queue is assigned a weight indicative of a transmission channel capacity or a transmission channel priority by the packet classifier, and wherein a data packet in a station queue with a higher weight is transmitted via a network interface before a data packet in a station queue with a lower weight; and a hierarchical scheduling module stored in a computer-readable storage medium and executable by a processing device, wherein the hierarchical scheduling module:

selects a first scheduled data packet for transmission from a first priority transmission queue, based on the associated packet priority levels of the plurality of priority transmission queues and the weights of the one or more station queues, transmits the first scheduled data packet over a selected transmission channel, via the network interface, determines whether the transmitted first scheduled data packet has failed to reach its destination, and when the transmitted first scheduled data packet has failed to reach its destination, defers the retransmission of the first scheduled data packet and transmits a second scheduled data packet from another station queue of the first priority transmission queue, via the network interface.

2. The system of claim 1, wherein the selection of scheduled data packets is made utilizing weighted round robin for each station queue.

3. The system of claim 1, wherein the selection of scheduled data packets is made utilizing weighted fair queueing for each station queue.

4. The system of claim 1, wherein the hierarchical scheduling module further re-queues the first scheduled data packet for re-transmission at the station queue from which the first scheduled data packet was originated from.

5. The system of claim 4, wherein the failed packet is re-queued at a head of the station queue from which the first scheduled data packet was originated.

6. The system of claim 1, wherein the assigned weights are modified based on one or more current channel conditions associated with each priority transmission queue.

7. The system of claim 6, wherein the modification to each of the assigned weights is proportional to an associated channel capacity.

8. The system of claim 6, wherein the modification is limited to a predetermined minimal value.

9. The system of claim 6, wherein the modification to each of the queue weights is proportional to an estimation of throughput performance.

10. The system of claim 9, wherein the estimation of throughput performance is based on at least one of a throughput model, packet encoding rule, and packet transmission time.

11. A computer implemented method for increasing wireless network throughput, the method comprising:
  receiving a data packet by a packet classifier;
  assigning the packet to one of a plurality of priority transmission queues, wherein each of the plurality of the priority transmission queues includes an associated packet priority level for data transmission and one or more station queues, wherein each station queue is assigned a weight indicative of a transmission channel capacity or a transmission channel priority, and wherein a data packet in a station queue with a higher weight is transmitted before a data packet in a station queue with a lower weight;
  selecting a first scheduled data packet for transmission from a first priority transmission queue, based on the associated packet priority levels of the plurality of priority transmission queues and the weights of the one or more station queues;
  transmitting the first scheduled data packet over a selected transmission channel, via a network interface;
  determining whether the transmitted first scheduled data packet has failed to reach its destination; and
  when the transmitted first scheduled data packet has failed to reach its destination, deferring the retransmission of the first scheduled data packet and transmitting a second scheduled data packet from another station queue of the first priority transmission queue via the network interface.

12. The method of claim 11, wherein said selecting the scheduled data packets is made utilizing weighted round robin for each station queue.

13. The method of claim 11, wherein said selecting the scheduled data packets is made utilizing weighted fair queueing for each station queue.

14. The method of claim 11, further comprising re-queuing the first scheduled data packet for re-transmission at the station queue from which the first scheduled data packet was originated from.

15. The method of claim 14, wherein the failed packet is re-queued at a head of the station queue from which the first scheduled data packet was originated.

16. The method of claim 11, wherein the assigned weights are modified based on one or more current channel conditions associated with each priority transmission queue.

17. The method of claim 16, wherein the modification to each of the assigned weights is proportional to an associated channel capacity.

18. The method of claim 16, wherein the modification is limited to a predetermined minimal value.

19. The method of claim 16, wherein the modification to each of the queue weights is proportional to an estimation of throughput performance.

20. The method of claim 19, wherein the estimation of throughput performance is based on at least one of a throughput model, packet encoding rule, and packet transmission time.

* * * * *